E. P. Hoyt,
Plate for Artificial Teeth.
N° 52,290. Patented Jan. 30, 1866.

Witnesses:
Charles L. Barritt
Jas Henderson

Inventor.
Ezra P Hoyt

UNITED STATES PATENT OFFICE.

EZRA P. HOYT, OF NEW YORK, N. Y.

IMPROVEMENT IN ARTIFICIAL TEETH.

Specification forming part of Letters Patent No. 52,290, dated January 30, 1866.

*To all whom it may concern:*

Be it known that I, EZRA P. HOYT, of the city, county, and State of New York, have invented a certain new and useful method of constructing metal bases for sets of artificial teeth, in combination with hard rubber or other vulcanizable gums; and I do hereby declare the following to be a full description of the same.

The object of my invention is to combine the advantages of a metal plate with hard rubber or other vulcanizable gum, so as to attain perfect adaptation of fit to the gums and roof of the mouth, and which cannot, under any circumstances, be obtained with the metal plate when separately used and subjected to the intense heat necessary to solder the teeth thereto; and the nature of my invention consists in the use of a metal base or plate with a perforated gum-ridge, and having a re-enforce strip of metal soldered to the upper back edge or arch of the plate to stiffen it and prevent the hard rubber from peeling from the upper surface of the plate, and also another one soldered to the under side of the metal plate just behind the teeth, so as to form an additional support to them, and under which the hard rubber engages, and thus holds the teeth firmly and securely to the plate, while at the same time it adds to the finish of it.

But to describe my invention more particularly, I will refer to the accompanying drawings, forming a part of this specification, the same letters of reference, wherever they occur, referring to like parts.

Figure 1:
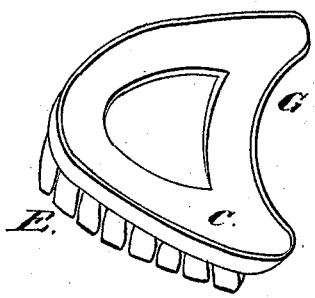
Figure 2:
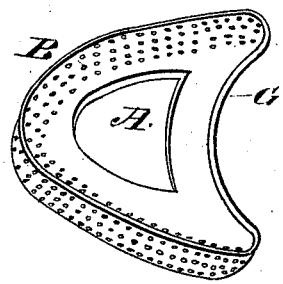
Figure 3:
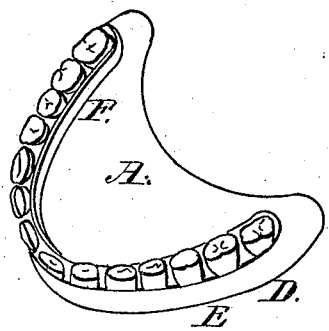
Figure 4:
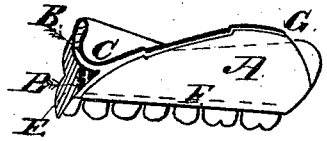

Figure 1 is a perspective view of the upper side of a set of teeth. Fig. 2 is a perspective view of the metal base. Fig. 3 is a perspective view of the lower side of a set of teeth. Fig. 4 is a longitudinal cut section of a set of teeth.

Letter A is a metal plate, which may be made of gold or platina, or any other suitable metal, having the gum-ridge only perforated with a great number of small holes, B. The object of this is to cause the hard rubber C (which forms the lining of the upper surface of the plate, to adapt it to fit gums and roof of the mouth more perfectly than could be obtained by a metal plate) to unite with the hard rubber D surrounding the shanks of the teeth E, adjusted in the under side of the plate through the said perforations, and thus hold them firmly attached to the plate. To strengthen and support the rubber, to assist to secure the teeth to the plate, and also to give a perfectly clean metal finish to the lower side of the plate, I solder a narrow re-enforce strip of metal, F, to it just back of the shanks of the teeth, with a slightly-projecting edge, under which the rubber engages and is held firmly united to the teeth, and thus not only greatly strengthens the support to the teeth but also makes a more elegant finish to the work. On the upper back edge or arch of the plate is soldered another strip of metal, G, and having a ledge formed under its front edge to admit of the hard rubber engaging under it, and thereby keep it from peeling, as would be likely to happen in some cases. It is also the object of this strip of metal to stiffen or re-enforce the plate in the roof of the mouth.

It will be obvious that all artificial sets of teeth are, to a certain extent, an impediment not only to speech, but to the mastication of food. The object of all dentists, therefore, is to mitigate these inconveniences to the wearer of artificial teeth as much as possible. Consequently the thinner the plate on which the artificial teeth are secured the better, so long as the requisite amount of strength can be preserved to make the teeth servicable and permanent. It is with this view, therefore, that I have adopted the method hereinbefore described for obtaining perfect adaptation of fit to the gums and roof of the mouth, and lightness, accompanied with strength, as well as elegance of finish, with durability of wear, in making sets of artificial teeth.

Having now described my improvements, I will proceed to set forth what I claim and desire to secure by Letters Patent of the United States.

A metal base having a perforated gum-ridge, B, and re-enforce strips of metal F and G, in combination with the hard-rubber or other vulcanizable gums and artificial teeth, substantially as described, for the purpose of making sets of artificial teeth.

EZRA P. HOYT.

Witnesses:
CHARLES L. BARRITT,
JAS. HENDERSON.